(12) United States Patent
Kumar et al.

(10) Patent No.: US 12,216,570 B2
(45) Date of Patent: Feb. 4, 2025

(54) SOFTWARE TESTING WITH RELIABILITY METRIC

(71) Applicant: SAP SE, Walldorf (DE)

(72) Inventors: Ashish Kumar, Patna (IN); Relvin Richards Raj, Bangalore (IN)

(73) Assignee: SAP SE, Walldorf (DE)

( * ) Notice: Subject to any disclaimer, the term of this patent is extended or adjusted under 35 U.S.C. 154(b) by 145 days.

(21) Appl. No.: 17/881,465

(22) Filed: Aug. 4, 2022

(65) Prior Publication Data

US 2024/0045795 A1     Feb. 8, 2024

(51) Int. Cl.
*G06F 11/36* (2006.01)

(52) U.S. Cl.
CPC ...... *G06F 11/3696* (2013.01); *G06F 11/3668* (2013.01)

(58) Field of Classification Search
CPC .................. G06F 11/3668; G06F 11/3696
See application file for complete search history.

(56) References Cited

U.S. PATENT DOCUMENTS

| 8,856,748 | B1 | 10/2014 | Larsen et al. | |
|---|---|---|---|---|
| 9,280,442 | B1 * | 3/2016 | Nicolo | G06F 11/3604 |
| 10,719,427 | B1 * | 7/2020 | Arguelles | G06F 11/3684 |
| 10,824,532 | B2 | 11/2020 | Raj et al. | |
| 2004/0230953 | A1 * | 11/2004 | Garzia | G06F 11/008 |
| | | | | 717/124 |
| 2012/0017195 | A1 * | 1/2012 | Kaulgud | G06F 11/3692 |
| | | | | 717/101 |
| 2014/0123110 | A1 | 5/2014 | Wan et al. | |
| 2015/0347282 | A1 * | 12/2015 | Wingfors | G06F 11/3664 |
| | | | | 717/124 |
| 2017/0180487 | A1 * | 6/2017 | Frank | G06F 11/3688 |
| 2017/0220403 | A1 | 8/2017 | Maag et al. | |
| 2018/0137035 | A1 | 5/2018 | Magre et al. | |
| 2018/0275970 | A1 * | 9/2018 | Woulfe | G06F 11/3668 |
| 2019/0213115 | A1 * | 7/2019 | Takawale | G06F 11/3692 |
| 2020/0117567 | A1 | 4/2020 | Raj et al. | |
| 2022/0050766 | A1 * | 2/2022 | Tate | G06F 11/3608 |

OTHER PUBLICATIONS

Applicant Statement, regarding activities prior to Aug. 4, 2021, 1 page.
European Search Report received in counterpart European Patent Application No. 23186410.9, dated Jan. 2, 2024, 10 pages.
"Test Suite Analytics," SAP Solution Manager 7.2—Test Suite, SAP SE, Apr. 2018, pp. 1-60, 60 pages.
"Tricentis Tosca," *Wikipedia*, en.wikipedia.org, visited Jun. 30, 2022, 3 pages.
"View Reports" in "Tosca Dashboards Manual 1.0," support-hub.tricentis.com, Tricentis, visited Jun. 30, 2022, 5 pages.
"Smoke testing (software)," *Wikipedia*, en.wikipedia.org, visited Aug. 1, 2022, 3 pages.

* cited by examiner

*Primary Examiner* — Wei Y Zhen
*Assistant Examiner* — Brahim Bourzik
(74) *Attorney, Agent, or Firm* — Klarquist Sparkman, LLP

(57) ABSTRACT

An example method comprises forming a communication link between a software test orchestration tool and a testing dashboard; receiving from the software test orchestration tool an indication of software test results at the application level of granularity, wherein the results indicate reliability status for a plurality of software applications; and calculating a reliability metric based on the indication of software test results.

20 Claims, 14 Drawing Sheets

FIG. 5

| Test Plan | System | Package | Status | Log ID | Reliability | Execution Date&Time |
|---|---|---|---|---|---|---|
| S4HCE_2202_HFE_VPSX_SmokeTest | NUD | Master Data | ⊘ PASS | MasterDataNUD0107202220xxxx | 100.0% | 01/07/2022 02:26:37 |
| S4HCE_2202_HFE_VPSX_SmokeTest | NUD | Sales1 | ⊘ OK | Sales1NUD0107202202020253 | 100.0% | 01/07/2022 02:24:13 |
| S4HCE_2202_HFE_VPSX_SmokeTest | NUD | SupplyChain1 | ⊘ FAIL | SupplyChain1NUD0107202202020248 | 96.9% | |
| S4HCE_2202_HFE_VPSX_SmokeTest | NUD | Procure | ⊘ PASS | ProcureNUD0107202202020255 | 100.0% | 01/07/2022 02:13:17 |
| S4HCE_2202_HFE_VPSX_SmokeTest | NUD | Fin1 | ⊘ FAIL | Fin1NUD0107202202020246 | 99.0% | 01/07/2022 02:11:32 |
| S4HCE_2202_HFE_VPSX_SmokeTest | NUD | Sales2 | ⊘ PASS | Sales2NUD0107202202020312 | 100.0% | |
| S4HCE_2202_HFE_VPSX_SmokeTest | NUD | SupplyChain2 | ⊘ PASS | SupplyChain2NUD0107202202020243 | 100.0% | 01/07/2022 02:09:00 |
| S4HCE_2202_HFE_VPSX_SmokeTest | NUD | WDSupplyChain2 | ⊘ PASS | WDSupplyChain2NUD0107202202020306 | 100.0% | 01/07/2022 02:08:22 |
| S4HCE_2202_HFE_VPSX_SmokeTest | NUD | Fin3 | ⊘ PASS | Fin3NUD0107202202020251 | 100.0% | |
| S4HCE_2202_HFE_VPSX_SmokeTest | NUD | SupplyChain3 | ⊘ PASS | SupplyChain3NUD0107202202020300 | 100.0% | |
| S4HCE_2202_HFE_VPSX_SmokeTest | NUD | WDSales | ⊘ PASS | WDSalesNUD0107202202020246 | 100.0% | |
| S4HCE_2202_HFE_VPSX_SmokeTest | NUD | Fin2 | ⊘ FAIL | Fin2NUD0107202202020055 | 100.0% | |
| S4HCE_2202_HFE_VPSX_SmokeTest | NUD | WDFin | ⊘ PASS | WDFinNUD0107202202020308 | 100.0% | |
| S4HCE_2202_HFE_VPSX_SmokeTest | NUD | WDSupplyChain1 | ⚠ IN PROCESS | Fin2NUD0107202202020055 | NA | |

Reliability
Apps: 98
Pass: 95
Fail:3
OK: 0
Error: 0

FIG. 6

UI Smoke Test ▼

Search in: Apps

| Search: | Test Plan: | System: | App. Area: | Package: | Status: | Log ID: | Execution Date |
|---|---|---|---|---|---|---|---|
| | | | Fin x | | | | 01/07/2022-01/07/2022 |

↑ 820

Display Reliability

Go  Clear  Adapt Filters

Results (4)

| Test Plan | System | Package | Status | Log ID | Reliability | Execution Date&Time |
|---|---|---|---|---|---|---|
| S4HCE_2202_HFE_VPSX_SmokeTest | NUD | Fin1 | OK | Fin1NUD01072022020246 | 99.0% | 01/07/2022 02:26:56 |
| S4HCE_2202_HFE_VPSX_SmokeTest | NUD | Fin3 | PASS | Fin3NUD01072022020251 | 100.0% | 01/07/2022 02:20:25 |
| S4HCE_2202_HFE_VPSX_SmokeTest | NUD | Fin2 | PASS | Fin2NUD01072022020255 | 100.0% | 01/07/2022 02:09:56 |
| S4HCE_2202_HFE_VPSX_SmokeTest | NUD | WDFin | PASS | WDFinNUD01072022020308 | 100.0% | 01/07/2022 02:09:00 |

| UI Smoke Test ▼ | | | |
|---|---|---|---|
| Fin1NUD01072022020246 | | Execution Date: 01/07/2022 | |
| Test Plan: S4HCE_2022_HFE_VPSX_SmokeTest | | 1120 → Reliability ⓘ 100% | |
| System ID: NUD | | 1130 → Status: ⊗ App Error | |
| Package: Fin1 | | | |

Search in: *Apps* 🔍

Logs(96)

Search 🔍   ↻ ↑   🗄 ⚙

| App Name | App Tag | Username | Status | Error Details |
|---|---|---|---|---|
| Application Logs | FinanceApplicationLog-showDetails | OVERHEAD_ACCOUNTANT | ⊗ APP ERROR | Error Popup is Displayed |
| Cost Center -- Plan/Actual | CostCenter-analyzePlanActualPC | OVERHEAD_ACCOUNTANT | ⊘ PASS | |
| Run Settlement - Actual | Project-runSettlement-zeroPlanData | OVERHEAD_ACCOUNTANT | ⊘ PASS | |
| Set Financial Plan Data to Zero | Financial-zeroPlanData | OVERHEAD_ACCOUNTANT | ⊘ PASS | |
| Manage Statistical Key Figure Values | StatisticalKeyFigure-manageSKFValues | OVERHEAD_ACCOUNTANT | ⊘ PASS | |
| Days Sales Outstanding | DaysSalesOutstandingKPI-Configuration | AR_MANAGER | ⊘ PASS | |
| Manage Cost Centers | CostCenter-manage | OVERHEAD_ACCOUNTANT | ⊘ PASS | |
| Manage Activity Types | ActivityType-manage | OVERHEAD_ACCOUNTANT | ⊘ PASS | |
| Manage Cost Rates - Plan | ActivityType-managePlanCostRates | OVERHEAD_ACCOUNTANT | ⊘ PASS | |
| Program FCOM GROUP NAVIGATION | MasterDataHierarchy-launchGroupBackendUtilities | OVERHEAD_ACCOUNTANT | ⊘ PASS | |

1110 (arrow pointing to APP ERROR)

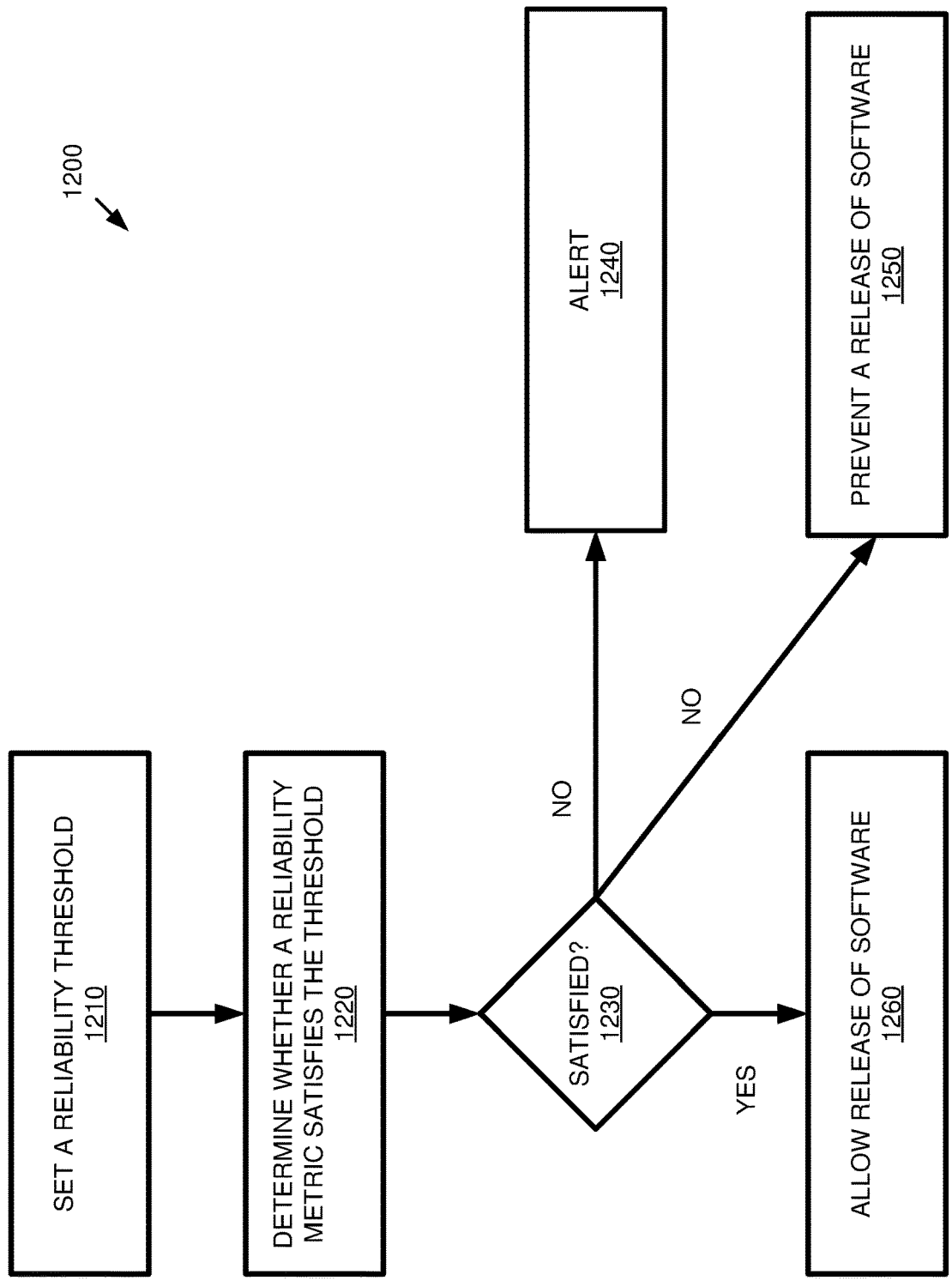

SOFTWARE TESTING WITH RELIABILITY METRIC

FIELD

The field generally relates to software testing.

BACKGROUND

Software testing of large software projects can be particularly challenging. Computer software requires extensive testing prior to release, and large software projects present a special challenge due to the sheer number of components. The situation is exacerbated by the typical time pressure that accompanies a software release.

In practice, software testing of large software projects is managed with test management tools. A test management tool can schedule test execution, gather test results, and display test results. To facilitate testing, testing activity can be organized into test plans. The results of a test plan can be reported to determine whether the computer software is ready for release. However, current test management tools fall short of providing an accurate view of the testing progress that meaningfully informs the software release decision.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method comprises, in a software testing environment comprising a communication link between a software test orchestration tool and a reliability condition dashboard, receiving from the software test orchestration tool software test results at an application level of granularity, wherein the software test results comprise a plurality of reliability status category indicators for a plurality of software applications; calculating a reliability metric based on the plurality of reliability status category indicators for the plurality of software applications; and displaying the reliability metric in a user interface of the reliability condition dashboard.

In another embodiment, a system comprises one or more processors; memory; and one or more non-transitory computer-readable media storing computer-executable instructions that, when executed, cause the one or more processor to perform: in a software testing environment comprising a communication link between a software test orchestration tool and a reliability condition dashboard, receiving from the software test orchestration tool software test results at an application level of granularity, wherein the software test results comprise a plurality of reliability status category indicators for a plurality of software applications; calculating a reliability metric based on the plurality of reliability status category indicators for the plurality of software applications; and displaying the reliability metric in a user interface of the reliability condition dashboard.

In another embodiment, one or more non-transitory computer-readable media storing computer instructions that when executed by a computing system cause the computing system to perform operations comprising: during a software smoke test scenario applying a one-to-one mapping between test cases and a plurality of software applications, in a software testing environment comprising a communication link between a software test orchestration tool and a reliability condition dashboard, receiving from the software test orchestration tool software test results at an application level of granularity, wherein the software test results comprise a plurality of reliability status category indicators for the plurality of software applications; receiving from the software test orchestration tool an indication of a plurality of software packages to which the plurality of software applications belong; calculating a plurality of package reliability metrics for the plurality of software packages; displaying, in the reliability condition dashboard, the plurality of package reliability metrics; calculating a first overall reliability metric for the software test results that are displayed; displaying the first overall reliability metric in the reliability condition dashboard; displaying a filter panel in the reliability condition dashboard configured to receive a filter of the reliability status category indicators; receiving, via the filter panel, a selection of a subset of the reliability status category indicators; calculating an updated overall reliability metric based on the subset of the reliability status category indicators; and displaying the updated overall reliability metric.

As described herein, a variety of other features and advantages can be incorporated into the technologies as desired.

BRIEF DESCRIPTION OF THE DRAWINGS

FIG. 5 is a screenshot of a graphical user interface of a reliability condition dashboard.

FIG. 6 is a screenshot of a graphical user interface implementing a detailed view of a reliability statistic in a reliability condition dashboard.

FIG. 8 is a screenshot of an updated view of a graphical user interface filtering test results and displaying updated reliability metrics.

FIG. 11 is a screenshot of an updated view of graphical user interface with an updated reliability status category indicator of a result in a reliability condition dashboard.

FIG. 12 is a flowchart of an example method incorporating a reliability metric threshold.

DETAILED DESCRIPTION

Example 1—Overview

Figure 1:
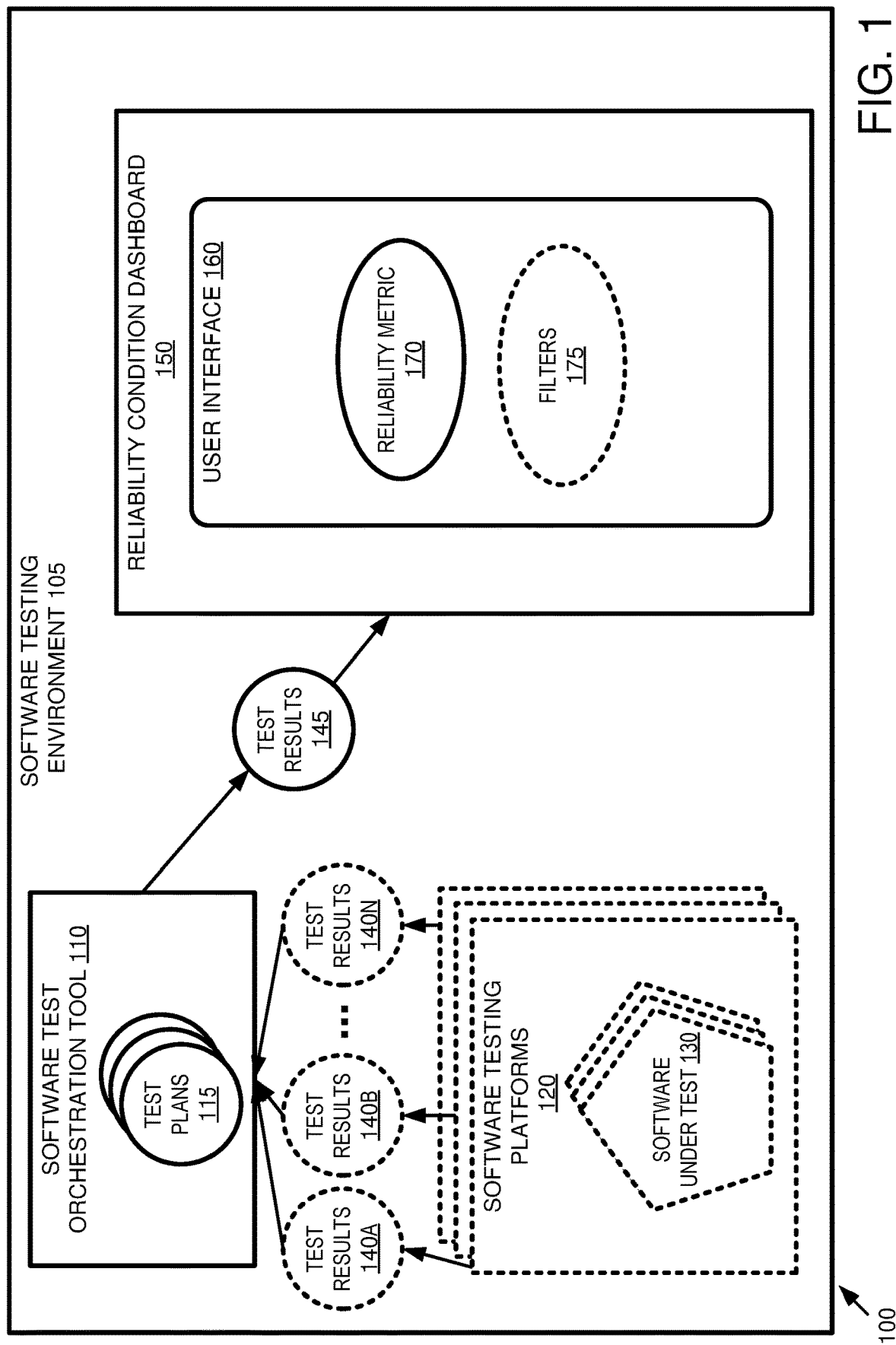
FIG. 1 is a block diagram of an example system implementing test plan orchestration with a reliability metric.

One of the major challenges of any software test orchestration tool is to report and track the status of software tests over time. Often, a decision of whether to release software must be made under time pressure, and testing progress is an essential element of the decision-making process. A software test orchestration tool that provides a binary assessment of software testing progress at the package level is not helpful because it does not provide a full picture of software reliability. The problem is magnified when senior decision makers become involved because a binary assessment does not give an accurate picture of progress or completion. A smoke testing scenario can be particularly challenging because although the number of tests per application may be low, there may be very many applications involved.

For example, a software test orchestration tool that only reports the number of packages that have passed or failed is not helpful in the release decision process. In practice, a test plan may include hundreds of applications across many packages. If a tool reports test plan pass rates based on the number of packages that fully passed, the rate is not an accurate measure of overall reliability. In a binary paradigm, if a single application fails, then the entire package is reported as failed. The failure indication is the same as if ten or a hundred applications failed. Such an approach is not an ideal representation of reliability, so it often becomes very tedious for developers and management to communicate test results and development progress to stakeholders and higher management before making a release decision.

In a related situation, some test results may be inaccurate. In a binary paradigm, a package with a single inaccurate test result can be inaccurately portrayed as a "fail." However, in practice, sometimes the testing software provides a "fail" result even though the testing team knows that the tested software is known to be reliable (e.g., it is a harmless error). As described herein, manual override of a test result can be supported to remove such inaccurate results.

As described herein, a reliability metric can be used to improve the reporting and monitoring of reliability for a software test plan. Reliability can be calculated as the proportion of applications or software test cases that passed in an execution of a software test plan. Details of test plans and test cases can be pulled from a test orchestration system into a reliability condition dashboard. The reliability condition dashboard can display the status of the test plans, test packages, test cases and applications, along with a reliability metric. As described herein, the reliability metric can be the proportion of test cases or applications that passed. A package-level reliability metric can be calculated as described herein.

The reliability condition dashboard can also support drill-down from the top-level view of the test plan, through to a detailed view of individual application status. In a more detailed view, the status of the application can be changed if it is a known application failure (e.g., a problem with the automate test case or is a harmless error). Allowing such post-test changes to the test status improves the accuracy of the reliability metric. Thus, manual override can also be supported.

The features can be applied in a smoke testing scenario as described herein, which has its own particular characteristics and challenges.

The ability to override testing results and exclude such results from the reliability metric gives a more accurate dashboard view of testing progress and serves as a reliable basis for software release decisions. Non-technical users, including supervisors and higher-level decision makers, can also benefit from the technologies because technical users can remove harmless errors from the reliability metric, presenting a more accurate view of testing progress on a reliability condition dashboard as described herein.

The reliability condition dashboard can additionally provide a filter feature to filter test packages or applications based on parameters such as name, test plan, system, application area, package, status, log identifier, and execution date. The reliability condition dashboard can additionally provide an overall (e.g., composite) reliability of the selected packages or applications. As shown, it can be more useful to report, display, and manipulate reliability metrics at a finer level of granularity than the plan or package level to provide improved reporting, analysis, and decision making for software testing.

Example 2—Example System Implementing Test Plan Orchestration with a Reliability Metric FIG. 1 is a block diagram of an example system 100 implementing test plan orchestration with a reliability metric. In the example, in a software testing environment 105, a software test orchestration tool 110 executes test plans 115 that test (e.g., execute) software under test 130 in one or more software testing platforms 120. The software test orchestration tool 110 (sometimes called "software test management tool") can execute the test plans 115 on an automated basis or under manual supervision by a software tester, or a combination. The technologies described herein can operate without regard to the type of software test orchestration tool 110.

The execution of the software test plans 115 tests software under test 130 and generates software test results 140A, 140B, . . . 140N. The software test results 140A, 140B, . . . 140N are communicated as test results 145 to the reliability condition dashboard 150. In practice, results 140A-N can be aggregated, batched, combined, or the like into the communicated results 145.

In an embodiment, the reliability condition dashboard 150 may be in communication with more than one software test orchestration tool. The test results 145 may be received from more than one test orchestration tool.

The reliability condition dashboard 150 provides a software testing user interface 160. The user interface 160 of the reliability condition dashboard 150 displays a reliability metric 170 as described herein. The dashboard 150 can display the test results and one or more reliability metrics in multiple views. The dashboard 150 can provide various reporting and search functionalities to the software tester, (e.g., those as described with respect to Example 14 below). An embodiment can implement filters 175 as described herein. The reliability condition dashboard 150 can provide editing and updating capabilities in the software testing user interface 160, as discussed with respect to Example 15 below.

The system 100 and any of the other systems described herein can be implemented in conjunction with any of the hardware components described herein (e.g., processing units, memory, and the like). Such computing systems are described herein (e.g., in Example 21). In any of the examples herein, the test plans 115, software test results 140A-N, test results 145, the reliability metric 170, filters 175, and the like can be stored in one or more computer-readable storage media or computer-readable storage devices. The technologies described herein can be generic to the specifics of operating systems or hardware and can be applied in any variety of environments to take advantage of the described features.

The system 100 can also comprise one or more non-transitory computer-readable media having stored therein computer-executable instructions that, when executed by the computing system, cause the computing system to perform any of the methods described herein.

In practice, the systems shown herein, such as system 100, can vary in complexity, with additional functionality, more complex components, and the like. For example, the software test orchestration tool 110 can direct software to be tested in heterogenous testing environments (e.g., platforms 120), including live production environments, testing environments, and sandboxed environments. The reliability condition dashboard 150 can provide additional user interface functionality as desired.

The described computing systems can be networked via wired or wireless network connections, including the Internet. Alternatively, systems can be connected through an intranet connection (e.g., in a corporate environment, government environment, or the like). The software test orchestration tool 110, the software testing platforms 120, and the reliability condition dashboard 150 can be implemented in the same computer or location or can be implemented on multiple computers in multiple locations connected in a distributed computing environment, such as the cloud computing environment described below in Example 23.

Example 3—Smoke Testing

Any of the examples herein can be implemented in a software smoke testing scenario. Such a test can be used early on in the testing process to get an overall view of testing progress. In an example smoke testing scenario shown herein, a single test (e.g., only a single test) is done per application. A given test case identifier can incorporate the application name, thereby serving as a useful notification of which application is involved in the test case. Such a test case can involve testing basic functionality of the application, such as launching the application and validating that it loaded correctly. Thus, a per-application test case approach can be used.

Software test results can be organized according to a test plan in a software smoke test scenario applying a one-to-one mapping between test cases and the plurality of software applications.

Example 4—Example Test Plan Hierarchy

Figure 2:
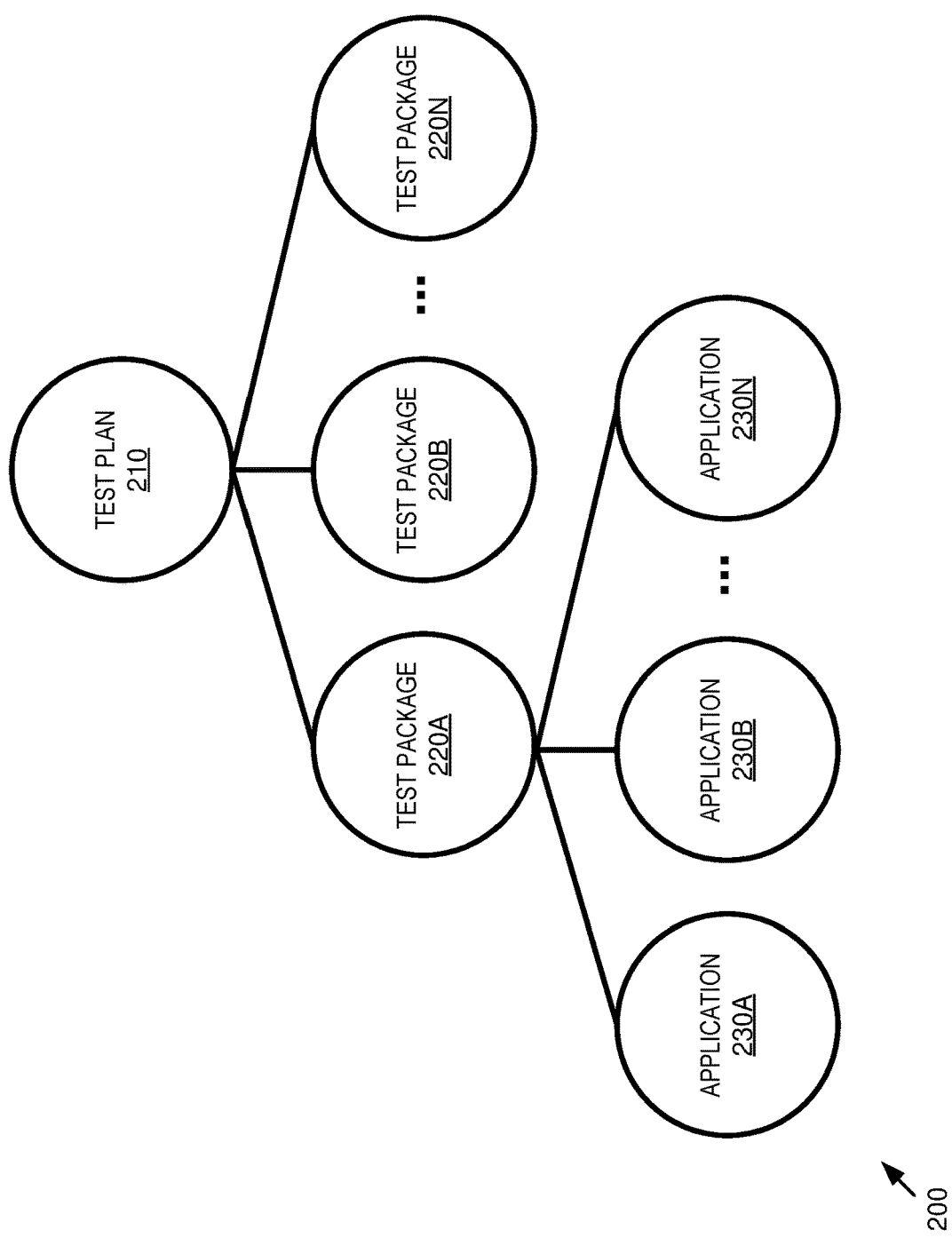
FIG. 2 is a block diagram of an example test plan hierarchy.

Any of the examples herein can implement a test plan according to a test plan hierarchy. The test plan helps organize testing for a testing project of software under test. FIG. 2 is a block diagram 200 of an example test plan hierarchy. In practice, the nodes of the hierarchy have an internal representation that is stored in one or more computer-readable media, and each node has a name or identifier that uniquely identifies it within the plan (e.g., package "WDSupplyChain1"). In the example, a software test plan 210 can comprise one or more software test packages 220A-N. The test packages can comprise multiple test cases. Because the test cases typically confirm functionality of respective applications (e.g., in a smoke testing scenario), they are sometimes called "applications" 230A-N herein. They can thus be per-application test cases (e.g., a one-to-one mapping between test cases and applications under test). The applications can be part of a larger software project that is under consideration for release.

In practice, the hierarchical arrangement is convenient because the applications 230A-N can be organized into packages (e.g., 220) relating to a relevant subset of functionality of the software under test (e.g., sales, finance, supply chain, master data, procurement, or the like). An application (e.g., 230A) stores a definition of a particular test case for an application (e.g., a series of one or more operations to be performed on the software under test and criteria for determining whether the software passes or fails the test). In practice, additional information can be included, such as information for initializing the test environment, credentials for opening connections to databases, and the like.

As shown herein, the test plan 210 can be executed by a software test orchestration tool 110, which typically also offers functionality for editing the test plan 210 and its nodes. The software test plan 210 can support software testing in heterogenous testing environments. The software test plans can be based on IEEE 829 and can meet standards set by the International Software Testing Qualifications Board (ISTQB), other best practices in the industry, or the like. The test plan 210 can be stored in a test plan history database that implements version control, logs historical test results, and the like.

As described herein, the software under test can execute in heterogenous computing platforms including testing environments and live production environments. A reliability condition dashboard 160 can display reliability metrics 170 for software one or more test plans 210, one or more test packages 220, or one or more applications 230 as described herein.

Example 5—Example Method of Test Plan Orchestration with a Reliability Metric

Figure 3:
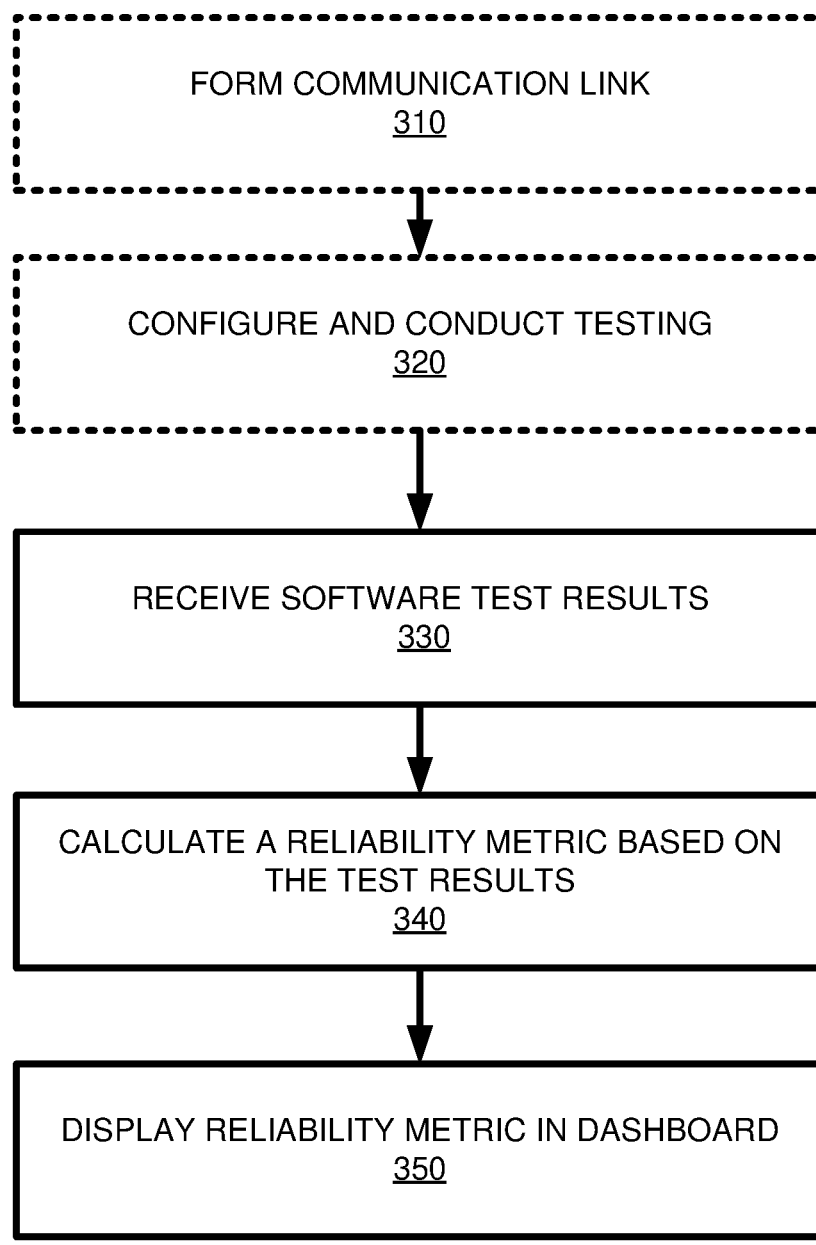
FIG. 3 is a flowchart of an example method of test plan orchestration with a reliability metric.

FIG. 3 is a flowchart of an example method 300 of test plan orchestration with a reliability metric and can be implemented, for example, by the system of FIG. 1. Also, the hierarchy of FIG. 2 can be implemented as part of the method 300.

In practice, a communication link is formed at 310 between a software test orchestration tool and a reliability condition dashboard. Any number of techniques including cloud connectors, API endpoints, and the like can be used to form such a connection. Testing is then configured and conducted at 320, for example, by a software test orchestration tool as described herein. As with other actions described herein, the order can be reversed.

Such activity can be performed preliminarily before applying the technologies described herein.

Subsequently, at 330, in a software testing environment comprising a communication link between the software test orchestration tool and the reliability condition dashboard, software test results at the application level of granularity are received from the software test orchestration tool. Such software test results comprise a plurality of reliability status category indicators for a plurality of software applications as described herein. Such software test results can indicate the results of individual applications (e.g., test cases of the applications) of the software under test. In practice, such results are stored and aggregated as described herein.

The software test results can include information such as test plan identifier, system identifier, package identifier, application identifier, execution log identifier, execution date and time, and reliability status. The reliability status can comprise a category indicator related to test pass or fail as defined by the software test orchestration tool. Other reliability status category indicators are described herein.

At 340, a reliability metric is calculated based on the received software test results. As described herein, a reliability metric can be calculated as the percentage of total applications (e.g., from the test plan, package, or filtered as described herein) that are deemed to be reliable or to have harmless errors during testing (e.g., have the status "pass" or the status "App Error"); the metric can thus be a proportion as described herein.

At 350, one or more reliability metrics are displayed in a user interface of the reliability condition dashboard. Various examples are described herein, such as an overall metric, one or more package-level metrics, or the like.

Further, an action can be taken based on a reliability metric as described herein. For example, an alert can be generated, software can be released, or the release of software under test can be blocked.

As described herein, a per-package reliability metric can be calculated in an embodiment where the software test orchestration tool supports a plurality of test packages. For example, an indication of the plurality of test packages to which the plurality of software applications belong can be received. The plurality of reliability status category indicators for the plurality of software applications can be aggregated at a test package level. The per-test-package reliability metrics can be displayed in the user interface of the reliability condition dashboard.

As described herein, a filter panel can be displayed in the user interface of the reliability condition dashboard that displays one or more filters for the plurality of indications of software test results. A filter indication can be received via the one or more filters. The indications of results can be filtered to a subset based on the filter indication. Per-test-package reliability metrics can be updated based on the subset of the indications of software test results. Such updating removes display of software packages having no remaining indications after filtering. An overall reliability metric can be calculated from the subset.

Other filter implementations can update pre-test-package reliability metrics. Filtered indications are excluded from reliability metric calculations.

Responsive to receiving an activation of the displayed reliability metric a reliability summary can be displayed as described herein. Such a reliability summary can comprise a summary of reliability status category indicators (e.g., counts of respective categories) serving as a basis of the reliability metric.

As described herein, a reliability metric threshold can be used. Such a threshold can be received and an attempted release of a software program incorporating the software under test (e.g., software for which test results are received) can be blocked responsive to determining that the reliability metric does not meet the threshold.

In an embodiment, the reliability metric is displayed in a user interface displaying per-test-package reliability metrics for a plurality of test packages, and the method further comprises calculating an overall reliability metric incorporating reliability status category indicators for the plurality of test packages and displaying the overall reliability metric in the user interface of the reliability condition dashboard.

The method 300 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, receiving an indication of software test results can be described as sending an indication of software test results depending on perspective.

Example 6—Example Reliability Condition Dashboard

In any of the examples herein, a software reliability metric can be incorporated into a reliability condition dashboard. Such a dashboard can be implemented as a program, application, web application, or the like that displays one or more reliability metrics as described herein.

The dashboard can incorporate filters, drill down (e.g., to an application-level view), summaries (e.g., counts of indicators), and other features to navigate through the voluminous data associated with testing a large software project. The software reliability metric can be calculated and displayed on a per-test-package basis, an overall basis, or both. Filtering can restrict the test results on which the displayed metrics are based, and the displayed metrics can be updated accordingly.

The dashboard can also incorporate manual test result setting, which is sometimes helpful in providing an accurate reliability metric as described herein.

Example 7—Example Test Results

In any of the examples herein, example test results can specify the results of testing. In practice, results can indicate a reliability status category (e.g., as a reliability status category indicator). Results can be communicated in a variety of ways. For example, test results can comprise a test package identifier, system identifier, a run status, a log identifier, and a reliability status category indicator of a given application. Alternatively, test results can comprise, for a given application, a test plan identifier, a system identifier, a package identifier, an application identifier, and a reliability status category indicator. A timestamp, tester name, application area, and the like can also be included.

Example 8—Example Application Level of Granularity

In any of the examples herein, software testing results can be received at the application level of granularity (e.g., a level of granularity that is finer than that of test package). Such an arrangement can provide per-application test results and avoid a binary reliability indicator for a test package because a finer level of reliability can be indicated (e.g., 1% or 99% versus simply "fail"). As described herein, a summary can then show the number of packages tested the number that passed, and the like.

Example 9—Example Reliability Status Category Indicators

In any of the examples herein, the reliability status can use a plurality of categories to indicate status (e.g., result) of an application test (e.g., the reliability status category indicators indicate test results). In practice, reliability status category indicators can be communicated to indicate the software test results. Although "pass" and "fail" category indicators can be used, one or more of the category indicators can go beyond "pass" and "fail." For example, one embodiment uses pass, fail, in progress, OK, and App Error.

"In progress" indicates that the application within the test plan has not completed execution. Pass indicates that the application passed (e.g., it met the passing criteria). Fail indicates that the application failed (e.g., it did not meet the passing criteria). OK indicates that a manual intervention was performed to complete execution of the test case automate for the application. App Error indicates that a manual intervention was performed to complete execution of the test case automate for the application, but it is an error that does not impact reliability of the application. A status of "App Error" can be deemed a harmless error. Manual override of the reliability category is supported. Other reliability category indicators can be used as desired.

Example 10—Example Reliability Metric Calculation

In any of the examples herein, a software reliability metric can be calculated as a proportion (e.g., a ratio) of successful test results (e.g., passed applications) to overall test results (e.g., applications tested). The various reliability category indicators can affect the calculation in different ways. The proportion can be represented as a percentage that is rounded to a particular level of significance (e.g., at the unit level, tenths level, or the like).

TABLE 1

Reliability Status Category Indicator Impact on Reliability Metric

| Indicator | Impact on Numerator | Impact on Denominator |
|---|---|---|
| Pass | Yes, add 1 | Yes, add 1 |
| Fail | No | Yes, add 1 |
| OK | No | Yes, add 1 |
| App Error | Yes, add 1 | Yes, add 1 |
| In progress | No | No |

Thus, the reliability metric can be calculated as a proportion of the number of applications passing to the number of applications tested (e.g., number of applications passing/number of applications tested). However, as shown, App Error results (e.g., manually overridden as having a testing-related error determined to be harmless) can be included in the applications that passed so that a 100% reliability can still be maintained, even if a result is set to "App Error" and not all tests passed.

In an alternative, an application having a result as App Error could simply be ignored in both the numerator and the denominator.

Such a feature can be helpful because release may be appropriate even if there is a test case that fails, causing an application to not pass. By excluding the result of "App Error," a 100% reliability can be indicated even if there are one or more applications that do not pass during testing (e.g., it is a harmless error that does not impact the reliability of the application).

As shown, the reliability metric can be a non-binary indicator (e.g., proportion, percentage, or the like) that goes beyond a mere "pass/fail" indication.

Further, color coding can be used when displaying the metric (e.g., portraying 100% as a different color from other values or the like).

Example 11—Example Method Displaying Test Results

Figure 4:
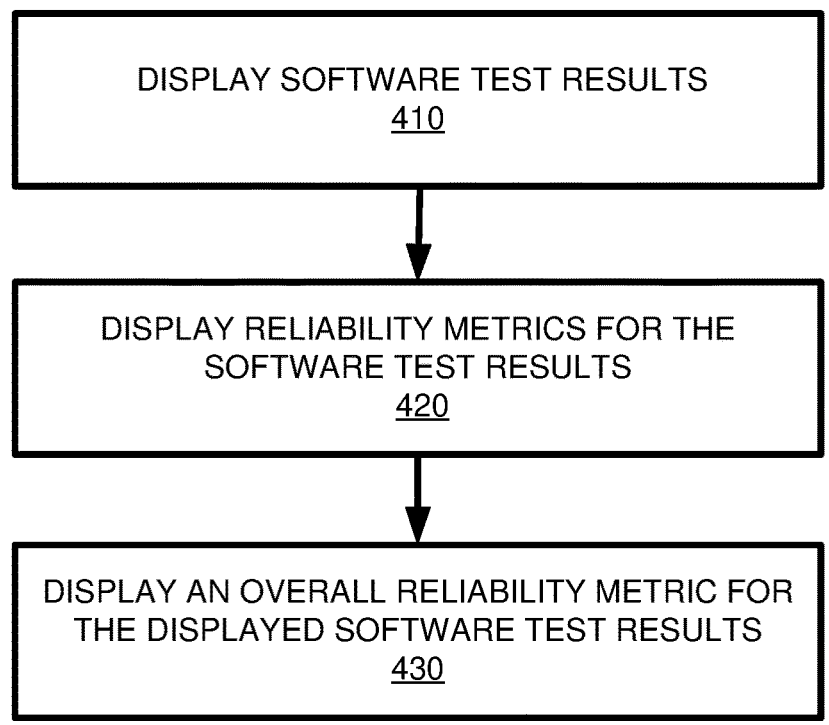
FIG. 4 is a flowchart of an example method of displaying test results.

FIG. 4 is a flowchart of an example method 400 displaying test results and can be implemented in any of the examples herein (e.g., by a reliability condition dashboard).

At 410, one or more software test results are displayed. The software test results can be the software test results described with respect to software test results 145 of FIG. 1. In practice, results can be aggregated by test package and overall results displayed on a per-test-package basis.

At 420, reliability metrics are displayed for the one or more software test results. In a test-package embodiment, respective reliability metrics are displayed for a plurality of test packages in a test plan.

At 430, an overall reliability metric for the displayed software test results is displayed. In one embodiment, an overall reliability metric can represent an overall reliability for a test package. For example, reliability status category indicators from different packages can be aggregated. Filters can be applied as described herein.

Example 12—Example Reliability Condition Dashboard User Interface

Figure 5:
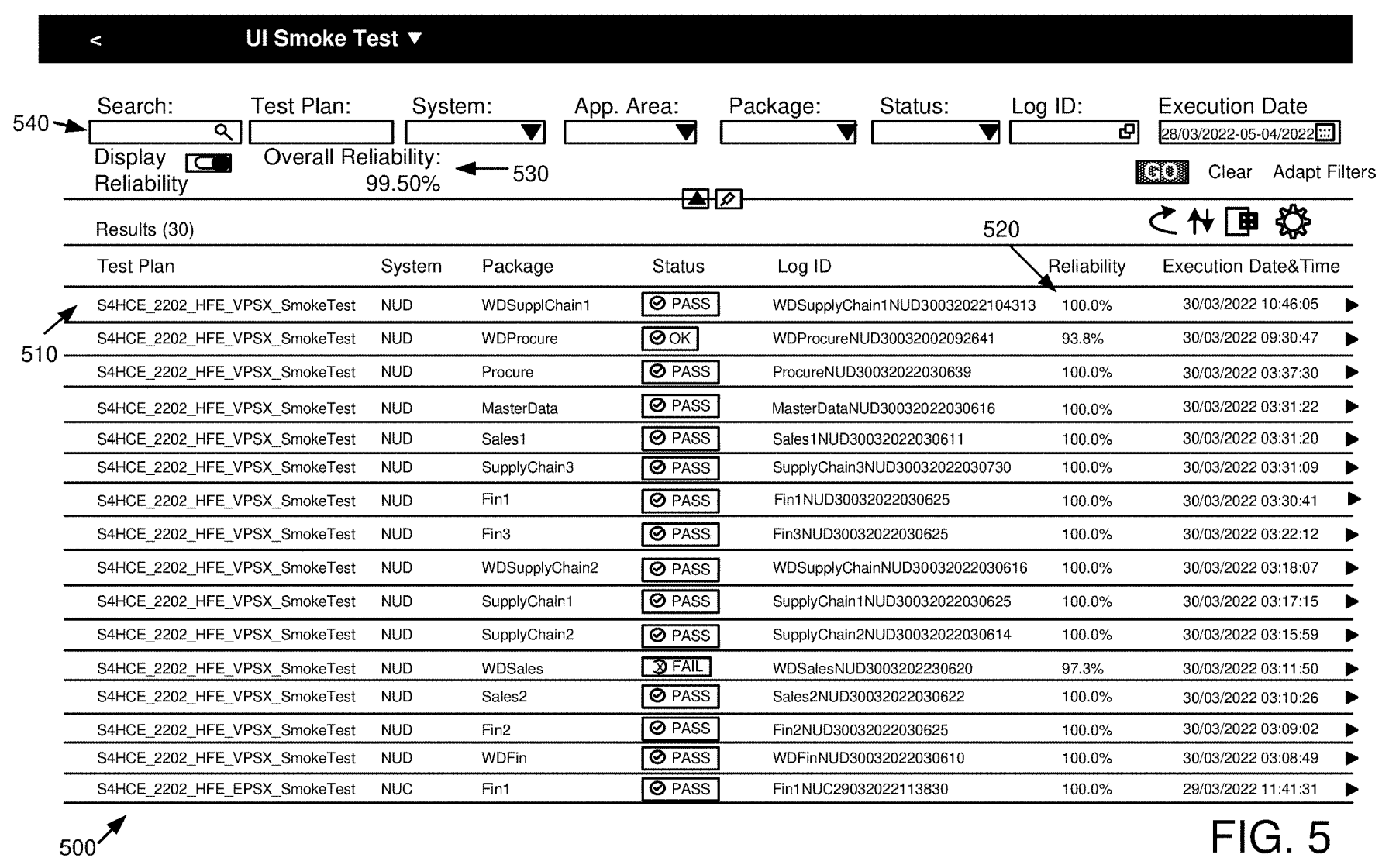

FIG. 5 is a screenshot 500 of a graphical user interface of a reliability condition dashboard and can be used in any of the examples herein. Software test results are displayed at the test package level of detail 510. Results from one test plan can be displayed. Alternatively, results from multiple test plans can be displayed as shown (e.g., VPDX and EPSX test plans), even though results are displayed at the test package level.

In the example, reliability metrics 520 are displayed. Reliability metrics 520 can be calculated as described herein. Reliability metrics can be calculated at the package level. In an alternate embodiment, reliability metrics can be calculated at the package and log ID level.

In the example, an overall reliability metric 530 is displayed. The overall reliability metric can be a combined reliability metric for the test plan results that are displayed in the graphical user interface.

In the example, a search filter 540 is provided. Search and filter capabilities are further described herein (e.g., with respect to FIGS. 7 and 8).

Example 13—Example Reliability Summary

In any of the examples herein, a reliability summary can be displayed. For example, responsive to detecting activation of a displayed reliability metric (e.g., by clicking, tapping, hovering over, or pointing to the displayed metric), a reliability summary can be displayed.

In practice, such a summary can be displayed in a pop-up window so that it can be easily read and dismissed. Alternatively, it can be displayed when hovering over or pointing to the metric and then dismissed momentarily.

The reliability summary can display the data behind the calculation. For example, a summary of the reliability status category indicators serving as a basis of the reliability metric can be displayed. Such a summary can show the categories and the number of indicators under the respective categories (e.g., number passed, number failed, number OK, number with App error, or the like) as well as the total number of Applications tested. Thus, for a given category, the count of indicators that were used to calculate the metric is shown.

FIG. 6 is a screenshot 600 of a graphical user interface implementing a detailed view of a reliability summary in a reliability condition dashboard such as that shown in FIG. 5 or FIG. 1. In the example, the reliability metric for package "SupplyChain1" with Log ID "SupplyChain1NUD1072022020248" ("96.9%") has been activated in the user interface. Responsive to activation, a summary is displayed and shows that the metric is based on test results for 98 applications, of which 95 have a reliability category of passed and 3 have a reliability category of failed. The reliability metric can be calculated as a proportion as described herein. At 610, the reliability metric is displayed as 96.9% (95/98).

As shown, the reliability summary can comprise a summary of reliability status category indicators (e.g., counts of respective categories) serving as a basis of the reliability metric.

As described herein, some results can be excluded from the metric, even if they are displayed in the summary (e.g., they do not impact the metric).

Example 14—Example Filtering Method

Figure 7:
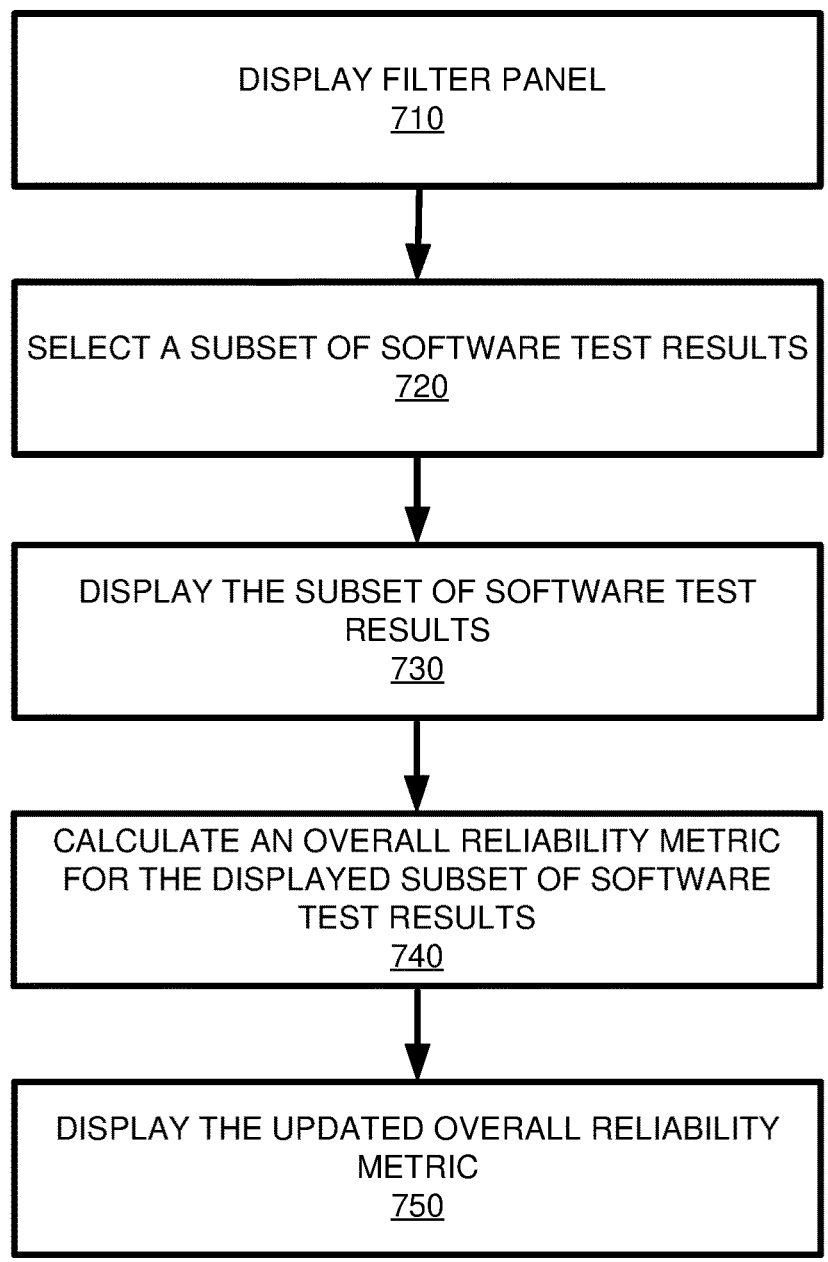
FIG. 7 is a flowchart of an example method of filtering test results.

FIG. 7 is a flowchart of an example method 700 for filtering test results within a reliability condition dashboard that can be used in any of the examples herein.

At 710, a filter panel is displayed. In one embodiment, the filter panel can be as shown in FIG. 5 filter panel 540. The filter can allow filtering by keyword, test plan, system, application, package, status, log identifier, and execution date and time, or the like. The filter user interface allows selection of one or more filters, which serve as criteria. Those software test results (e.g., indicators) that meet the criteria are kept in the calculations and display, and those that do not are removed from calculations and display. The dashboard can be updated accordingly.

At 720, a subset of software test results is selected based on the one or more filters selected from the filter panel.

At 730, the subset of software test results is displayed based on the one or more filters. For example, updating can remove display of software packages having no remaining indications after filtering. Filtered indications can be removed from reliability metric calculations.

At 740, an overall reliability for the displayed subset of software results is calculated. For example, the metric can be updated by calculating it from the subset of indications of software results filtered via the one or more filters. At 750, the updated overall reliability is displayed.

FIG. 8 is a screenshot 800 of an updated view of a graphical user interface (e.g., of FIG. 5) showing filtered test results and displaying updated reliability metrics in a reliability condition dashboard that can be used in any of the examples herein. At 810, a search filter can be provided. In the example, the results have been filtered by a search by application area. At 820, the filter "Fin" has been applied to Application Area. As a result, only those results relating to the application area "Fin" are shown. An application area can be a product area (e.g., procurement, production, sales, finance, etc.). Application area can be integrated into the test plan hierarchy shown in FIG. 2 (e.g., each application area can contain several packages, so application area is in the hierarchy).

Figure 9:
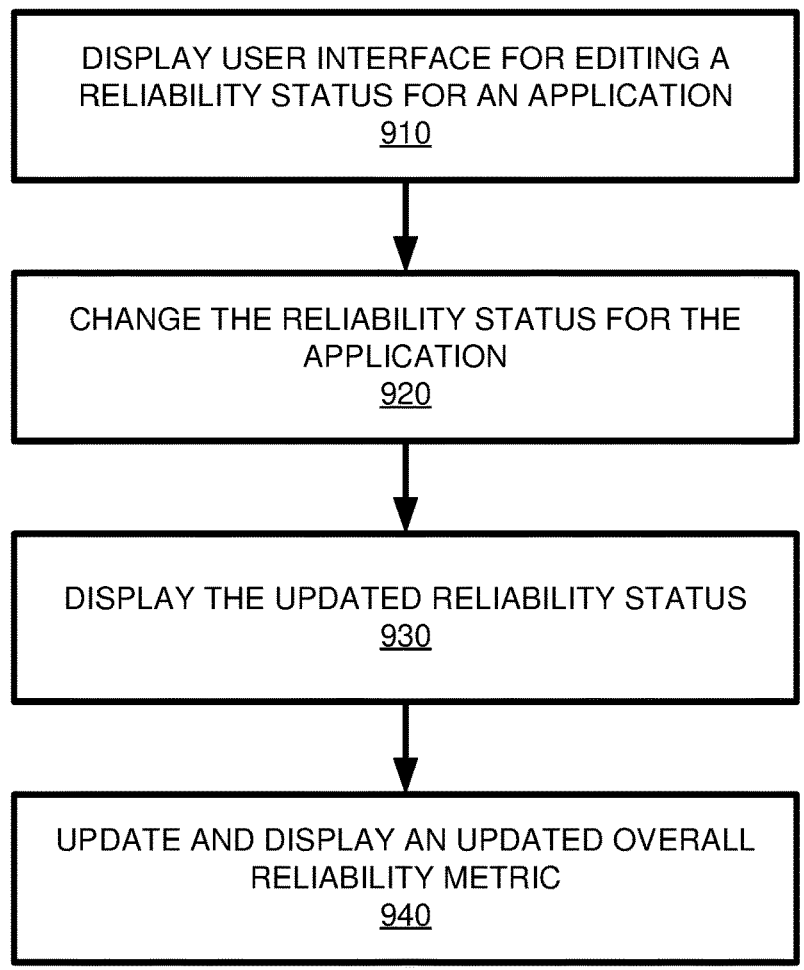
FIG. 9 is a flowchart of an example method of changing a reliability status category indicator of a result in a reliability condition dashboard.

Example 15—Example Graphical User Interface for Manually Adjusting Software Test Results FIG. 9 is a flowchart of an example method 900 for changing a reliability status category indicator of a result (e.g., of an application), and can be used in any of the examples herein involving reliability status category indicators.

At 910, a user interface element for editing a reliability status category indicator for an application is displayed. For example, the graphical user interface can respond to a click on a reliability status category indicator by displaying a menu, dropdown box, or the like for selecting one of the possible reliability status category indicators.

At 920, the reliability status category indicator of the application is changed. For example, the graphical user interface can respond to a selection of a menu item by sending an instruction to change the reliability status category indicator, as discussed with respect to FIG. 10.

At 930, an updated reliability status category indicator is displayed. For example, the graphical user interface can change the reliability status category indicator of the application to reflect the updated reliability status category indicator.

At 940, an overall reliability metric is updated and displayed. For example, the graphical user interface can send an instruction to recalculate the overall reliability metric for the displayed test packages. In such an example, the graphical user interface can then update a displayed reliability metric.

Figure 10:
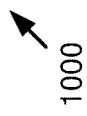
FIG. 10 is a screenshot of a graphical user interface changing a reliability status category indicator of a result in a reliability condition dashboard.

FIG. 10 is a screenshot 1000 of a graphical user interface for changing a reliability status category indicator of a result in a reliability condition dashboard. The screenshot 1000 can be a screenshot from the user interface 160 of a reliability assessment dashboard. The screenshot illustrates a user interface element 1010, in this case a menu, for selecting a reliability status category indicator of an application test case result. At 1020, the log identifier for the displayed group of applications is displayed. In the example, other information about the displayed group of applications is displayed. The test plan name, system identifier, and package identifier can be displayed. At 1030, the overall reliability for all of the displayed applications can be indicated. At 1040, the status of "OK/Fail" can be displayed next to the reliability metric of 99.0%, calling attention to the abnormal test result. Thus, the presence of an application that required manual intervention to complete the automate test case can be prominently displayed on the user interface. At 1050, a text-based note describing the error/warning details can be displayed. The text note can help the tester to determine which reliability category to select for the error.

FIG. 11 is a screenshot 1100 of a user interface showing results at the application level (e.g., each line represents an application). In the interface, an updated view of the user interface reflects having changed a reliability status category indicator of a result (e.g., from OK to App Error) in a reliability condition dashboard as described herein. At 1110, the App Error status indication can be displayed in a distinctive color, even though it does not impact the reliability negatively. Still, it is useful to call attention to the App Error result because it essentially overrides the testing process. At 1120, the reliability of 100% can be displayed, reflecting the lack of harmful errors. At 1130, the status of "App Error" can be displayed next to the reliability metric calling attention to the App Error status. Thus, although the App Error result does not impact reliability negatively, its presence can still be reflected on the user interface. Thus, viewers of the interface can quickly recognize that a manual setting has been applied, which can be helpful to inform the release decision process (e.g., to avoid accidental or surreptitious manual settings).

Example 16—Example Reliability Metric Threshold Method

FIG. 12 is a flowchart 1200 of an example incorporating a reliability metric threshold that can be used in any of the examples herein.

At 1210, a reliability threshold is set. Such a threshold can be configured via software and altered via a user interface if desired.

At 1220, it is determined whether a reliability metric meets the threshold. For example, an overall metric can be compared to the threshold. Or, a package-level threshold can be used.

At 1230, if it is determined that the reliability metric threshold is not met, then at 1240 an alert can be provided in the graphical user interface. Alternatively, an email or instant message can be sent (e.g., on a periodic basis until the threshold is met).

Alternatively, at 1230, responsive to determining that the reliability metric does not meet the threshold, at 1250 a release of the software under test (e.g., the software for which test results are received) can be blocked. For example, if a user attempts to release the software via a user interface element, a warning or alert can be shown that blocks the software. Alternatively, such a user interface element can be disabled (e.g., greyed out) to block release of the software.

At some point, at 1230, responsive to determining that the reliability metric does meet the threshold, at 1260 the release of the software under test can be allowed.

Other uses of the reliability application and the reliability metric can be implemented. For example, the reliability application can store software test results and reliability metrics in a database. The database can be used to generate reports about the progress of software testing over time.

Example 17—Example Detailed Method

In any of the examples herein, a more detailed embodiment can be implemented. For example, in a software testing environment comprising a communication link between a software test orchestration tool and a reliability condition dashboard, receiving, from the software test orchestration tool, software test results at the application level of granularity, wherein the software test results comprise a plurality of reliability status category indicators for a plurality of software applications; receiving from the software test orchestration tool an indication of a plurality of software packages to which the plurality of software applications belong; calculating a plurality of package reliability metrics for the plurality of software packages; displaying, in the reliability condition dashboard, the plurality of package reliability metrics; calculating a first overall reliability metric for the software test results that are displayed; displaying the first overall reliability metric in the reliability condition dashboard; displaying a filter panel in the user interface configured to receive a filter of the plurality of software test results; receiving, via the filter panel, a selection of a subset of the indications of software test results; calculating an updated overall reliability metric based on the subset of the indications of software test results; and displaying the updated overall reliability metric.

The method can further comprise displaying a first reliability status category indicator for the test result; displaying a user interface widget that allows the selection of a reliability category for the first reliability status category indicator; selecting a new reliability category in the widget; updating the display of the first reliability status category indicator to reflect the new reliability category; calculating an updated overall reliability metric; and displaying the updated overall reliability metric.

Example 18—Example Heterogeneous Testing Platforms

In any of the examples herein, a software project can be tested in plural, heterogenous test platforms. For example, a first test package can specify one or more applications to be tested in a first platform while a second test package specifies one or more applications to be tested in a second platform of a different testing platform type. Thus, the reliability condition dashboard can display reliability metrics derived from package results for packages having results derived from heterogeneous testing platforms, and an aggregated overall reliability metric can be derived from a combination of test results from heterogeneous testing platforms, while still remaining at the application level of granularity.

Example 19—Example Advantages

The reliability metric as described herein can be helpful to track progress of software testing at the package level as well as at the overall level.

A reliability condition dashboard as described herein can be implemented as a web application for easy consumption by test organizers and provides an overall view of software reliability during testing.

Application of the technologies to a software smoke testing scenario can be particularly helpful because a one-to-one mapping between applications and test cases can be supported. Reliability in a smoke testing scenario is accurately reflected by the reliability metric, whereas a package-level of granularity does not accurately indicate progress.

Showing progress at a fine-grained granularity (e.g., non-binary at the package level) reduces the overall time to check reliability.

The ability to override testing results and exclude such results from the reliability metric gives a more accurate dashboard view of testing progress and serves as a reliable basis for release decisions. Non-technical users can also benefit from the technologies because technical users can remove harmless errors from the reliability metric, presenting a more accurate view of testing progress on a reliability condition dashboard as described herein.

Example 20—Example Implementations

Any of the following can be implemented.
  Clause 1. A computer-implemented method comprising:
    in a software testing environment comprising a communication link between a software test orchestration tool and a reliability condition dashboard, receiving from the software test orchestration tool software test results at an application level of granularity, wherein the software test results comprise a plurality of reliability status category indicators for a plurality of software applications;
    calculating a reliability metric based on the plurality of reliability status category indicators for the plurality of software applications; and
    displaying the reliability metric in a user interface of the reliability condition dashboard.
  Clause 2. The method of Clause 1, wherein the software test results are organized according to a test plan in a software smoke test scenario applying a one-to-one mapping between test cases and the plurality of software applications.

Clause 3. The method of any one of Clauses 1-2, wherein:
the software test orchestration tool supports a plurality of test packages; and
the method further comprises:
receiving from the software test orchestration tool an indication of the plurality of test packages to which the plurality of software applications belong;
aggregating the plurality of reliability status category indicators for the plurality of software applications at a test package level; and
displaying per-test-package reliability metrics in the user interface of the reliability condition dashboard.

Clause 4. The method of Clause 3, further comprising:
displaying a filter panel in the user interface of the reliability condition dashboard;
receiving a filter indication via the filter panel;
filtering the reliability status category indicators to a subset based on the filter indication; and
updating the per-test-package reliability metrics based on the subset of the reliability status category indicators, wherein the updating removes display of software packages having no remaining indications after filtering.

Clause 5. The method of Clause 4, further comprising:
updating an overall reliability metric calculated from the subset of the reliability status category indicators filtered via the filter panel.

Clause 6. The method of any one of Clauses 3-5, further comprising:
displaying a filter panel in the user interface of the reliability condition dashboard that displays one or more filters for the plurality of reliability status category indicators;
receiving a filter indication via the one more filters;
filtering to a subset of the reliability status category indicators based on the filter indication; and
updating the per-test-package reliability metrics based on the subset of the reliability status category indicators, wherein the updating excludes filtered indications from reliability metric calculations.

Clause 7. The method of any one of Clauses 3-6, further comprising:
calculating an overall reliability metric incorporating reliability status category indicators for the plurality of test packages; and
displaying the overall reliability metric in the user interface of the reliability condition dashboard.

Clause 8. The method of any one of Clauses 1-7, wherein the reliability metric is based on the plurality of reliability status category indicators; and
the reliability metric is calculated as a proportion of passed applications to applications tested.

Clause 9. The method of Clause 8, wherein applications tested but manually overridden as having a harmless error are deemed as passed applications.

Clause 10. The method of any one of Clauses 1-9, further comprising:
responsive to receiving an activation of the displayed reliability metric, displaying a reliability summary of the plurality of reliability status category indicators serving as a basis of the reliability metric.

Clause 11. The method of any one of Clauses 1-10, further comprising:
displaying a overall reliability metric incorporating the plurality of reliability status category indicators for the plurality of software applications serving as a basis of the reliability metric and other reliability status category indicators for other plurality of software applications not serving as a basis of the reliability metric.

Clause 12. The method of any one of Clauses 1-11, further comprising:
in the user interface, receiving a selection of a first test result of the software test results, wherein the first test result has a first test status;
displaying one or more user interface elements displaying reliability categories for selection for the first test status;
receiving a selection of a new reliability category in the one or more user interface elements; and
updating the display of the reliability metric to reflect the new reliability category.

Clause 13. The method of any one of Clauses 1-12, wherein the reliability categories comprise in-progress, pass, fail, application error, and okay.

Clause 14. The method of any one of Clauses 1-13, further comprising:
receiving a reliability metric threshold for the reliability metric; and
providing an alert responsive to determining that the reliability metric does not meet the reliability metric threshold.

Clause 15. The method of any one of Clauses 1-14, further comprising:
receiving a reliability metric threshold for the reliability metric; and
responsive to determining that the reliability metric does not meet the reliability metric threshold, blocking an attempted release of a software program for which the software test results are received.

Clause 16. The method of any one of Clauses 1-15, wherein the software test results at the application level of granularity are received in a data structure that comprises, for a given application:
a test plan identifier,
a system identifier,
a package identifier,
an application identifier, and a reliability status category indicator.

Clause 17. A system comprising:
one or more processors;
memory; and
one or more non-transitory computer-readable media storing computer-executable instructions that, when executed, cause the one or more processor to perform:
in a software testing environment comprising a communication link between a software test orchestration tool and a reliability condition dashboard, receiving from the software test orchestration tool software test results at an application level of granularity, wherein the software test results comprise a plurality of reliability status category indicators for a plurality of software applications;
calculating a reliability metric based on the plurality of reliability status category indicators for the plurality of software applications; and
displaying the reliability metric in a user interface of the reliability condition dashboard.

Clause 18. The system of Clause 17, wherein applications tested but manually overridden as having a harmless error are deemed as passed applications.

Clause 19. One or more non-transitory computer-readable media storing computer instructions that when executed by a computing system cause the computing system to perform operations comprising:

during a software smoke test scenario applying a one-to-one mapping between test cases and a plurality of software applications, in a software testing environment comprising a communication link between a software test orchestration tool and a reliability condition dashboard, receiving from the software test orchestration tool software test results at an application level of granularity, wherein the software test results comprise a plurality of reliability status category indicators for the plurality of software applications;

receiving from the software test orchestration tool an indication of a plurality of software packages to which the plurality of software applications belong;

calculating a plurality of package reliability metrics for the plurality of software packages;

displaying, in the reliability condition dashboard, the plurality of package reliability metrics;

calculating a first overall reliability metric for the software test results that are displayed;

displaying the first overall reliability metric in the reliability condition dashboard;

displaying a filter panel in the reliability condition dashboard configured to receive a filter of the reliability status category indicators;

receiving, via the filter panel, a selection of a subset of the reliability status category indicators;

calculating an updated overall reliability metric based on the subset of the reliability status category indicators; and displaying the updated overall reliability metric.

Clause 20. The one or more non-transitory computer-readable media of Clause 19, wherein the operations further comprise:

displaying a first reliability status category indicator for a given test result;

displaying one or more user interface elements configured to receive a selection of a reliability category for the first reliability status category indicator;

receiving via the one or more user interface elements, a selection of a new reliability category;

updating the display of the first reliability status category indicator to reflect the new reliability category;

calculating an updated overall reliability metric; and displaying the updated overall reliability metric.

Clause 21. One or more non-transitory computer-readable media storing computer instructions that when executed by a computing system cause the computing system to perform the method of any one of Clauses 1-16.

Example 21—Example Computing Systems

Figure 13:
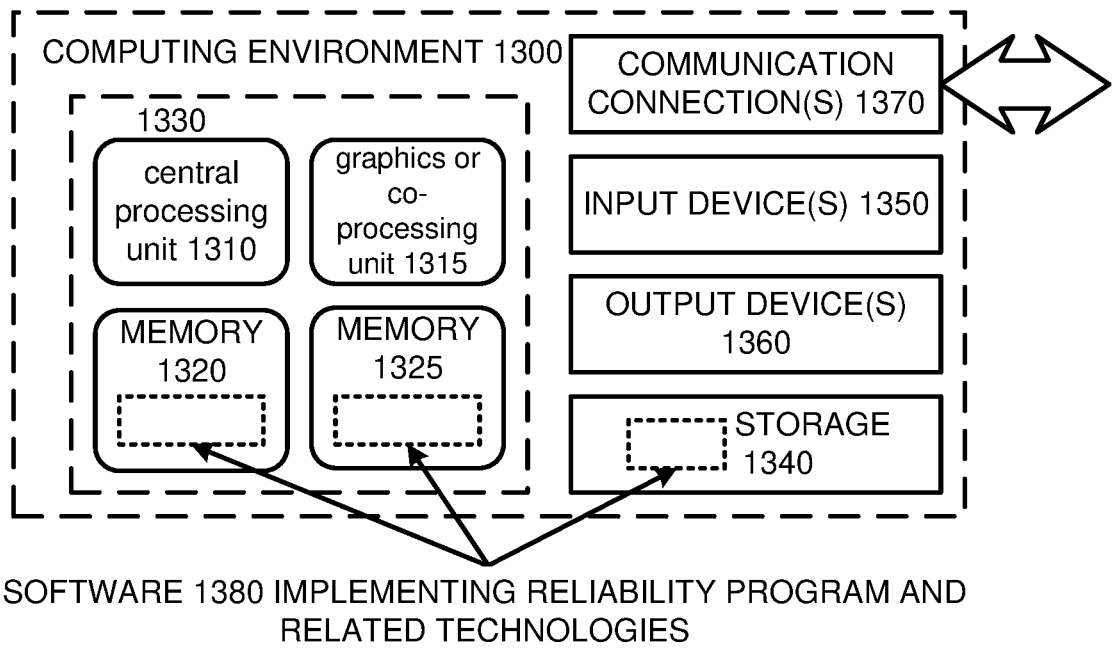
FIG. 13 is a block diagram of an example computing system in which described embodiments can be implemented.

FIG. 13 depicts an example of a suitable computing system 1300 in which the described innovations can be implemented. The computing system 1300 is not intended to suggest any limitation as to scope of use or functionality of the present disclosure, as the innovations can be implemented in diverse computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 can be volatile memory (e.g., registers, cache, RAM), non-volatile memory (e.g., ROM, EEPROM, flash memory, etc.), or some combination of the two, accessible by the processing unit(s) 1310, 1315. The memory 1320, 1325 stores software 1380 implementing one or more innovations described herein, for example, reliability program, in the form of computer-executable instructions suitable for execution by the processing unit(s) 1310, 1315.

A computing system 1300 can have additional features. For example, the computing system 1300 includes storage 1340, one or more input devices 1350, one or more output devices 1360, and one or more communication connections 1370, including input devices, output devices, and communication connections for interacting with a user. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 can be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software 1380 implementing one or more innovations described herein.

The input device(s) 1350 can be an input device such as a keyboard, mouse, pen, or trackball, a voice input device, a scanning device, touch device (e.g., touchpad, display, or the like) or another device that provides input to the computing system 1300. The output device(s) 1360 can be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 22—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 23—Example Cloud Computing Environment

Figure 14:
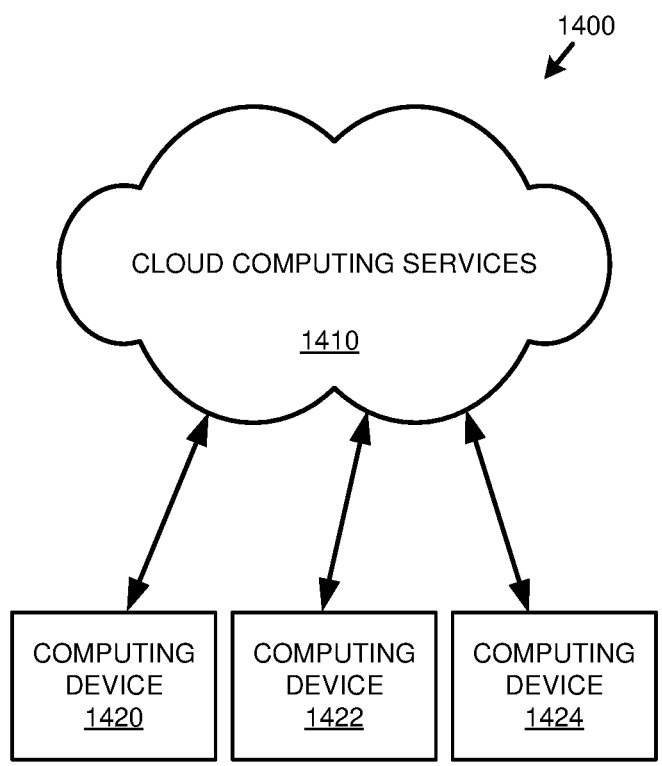
FIG. 14 is a block diagram of an example cloud computing environment that can be used in conjunction with the technologies described herein.

FIG. 14 depicts an example cloud computing environment 1400 in which the described technologies can be implemented, including, e.g., the system 100 of FIG. 1 and other systems herein. The cloud computing environment 1400 comprises cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 are utilized by various types of computing devices (e.g., client computing devices), such as computing devices 1420, 1422, and 1424. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1424) can utilize the cloud computing services 1410 to perform computing operations (e.g., data processing, data storage, and the like).

In practice, cloud-based, on-premises-based, or hybrid scenarios can be supported.

Example 24—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 25—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
in a software testing environment comprising a communication link between a software test orchestration tool and a reliability condition dashboard, receiving from the software test orchestration tool software test results at an application level of granularity, wherein the software test results comprise a plurality of reliability status category indicators for a plurality of software applications, wherein the reliability status indicators comprise an indication of pass and an indication of fail;
calculating a reliability metric based on the plurality of reliability status category indicators for the plurality of software applications, wherein the reliability metric incorporates non-binary reliability status category indicators configured to have more than two different values, and at least one of the non-binary reliability status category indicators comprises a value indicating that an error result has been manually overridden as having a testing-related error determined to be harmless;
displaying the reliability metric in a user interface of the reliability condition dashboard;
receiving a reliability metric threshold for the reliability metric; and
responsive to determining that the reliability metric does not meet the reliability metric threshold, blocking an attempted release of a software program for which the software test results are received.

2. The method of claim 1, wherein the software test results are organized according to a test plan in a software smoke test scenario applying a one-to-one mapping between test cases and the plurality of software applications.

3. The method of claim 1, wherein:
the software test orchestration tool supports a plurality of test packages; and
the method further comprises:
receiving from the software test orchestration tool an indication of the plurality of test packages to which the plurality of software applications belong;
aggregating the plurality of reliability status category indicators for the plurality of software applications at a test package level; and
displaying per-test-package reliability metrics in the user interface of the reliability condition dashboard.

4. The method of claim 3, further comprising:
displaying a filter panel in the user interface of the reliability condition dashboard;
receiving a filter indication via the filter panel;
filtering the reliability status category indicators to a subset based on the filter indication; and updating the per-test-package reliability metrics based on the subset of the reliability status category indicators, wherein the updating removes display of software packages having no remaining indications after filtering.

5. The method of claim 4, further comprising:
updating an overall reliability metric calculated from the subset of the reliability status category indicators filtered via the filter panel.

6. The method of claim 3, further comprising:
displaying a filter panel in the user interface of the reliability condition dashboard that displays one or more filters for the plurality of reliability status category indicators;
receiving a filter indication via the one or more filters;
filtering to a subset of the reliability status category indicators based on the filter indication; and
updating the per-test-package reliability metrics based on the subset of the reliability status category indicators, wherein the updating excludes filtered indications from reliability metric calculations.

7. The method of claim 3, further comprising:
calculating an overall reliability metric incorporating reliability status category indicators for the plurality of test packages; and
displaying the overall reliability metric in the user interface of the reliability condition dashboard.

8. The method of claim 1, wherein the reliability metric is based on the plurality of reliability status category indicators; and
the reliability metric is calculated as a proportion of passed applications to applications tested.

9. The method of claim 8, wherein applications tested but manually overridden as having a harmless error are deemed as passed applications.

10. The method of claim 1, further comprising:
responsive to receiving an activation of the displayed reliability metric, displaying a reliability summary of the plurality of reliability status category indicators serving as a basis of the reliability metric.

11. The method of claim 1, further comprising:
displaying a overall reliability metric incorporating the plurality of reliability status category indicators for the plurality of software applications serving as a basis of the reliability metric and other reliability status category indicators for other plurality of software applications not serving as a basis of the reliability metric.

12. The method of claim 1, further comprising:
in the user interface, receiving a selection of a first test result of the software test results, wherein the first test result has a first test status;
displaying one or more user interface elements displaying reliability categories for selection for the first test status;
receiving a selection of a new reliability status category in the one or more user interface elements; and
updating display of the reliability metric to reflect the new reliability status category.

13. The method of claim 12, wherein the reliability categories comprise in-progress, pass, fail, application error, and okay;
wherein okay indicates that a manual intervention was performed to complete execution of a test case automate for an application.

14. The method of claim 1, further comprising:
receiving a reliability metric threshold for the reliability metric; and providing an alert responsive to determining that the reliability metric does not meet the reliability metric threshold.

15. The method of claim 1, wherein the software test results at the application level of granularity are received in a data structure that comprises, for a given application:
a test plan identifier,
a system identifier,
a package identifier,
an application identifier, and
a reliability status category indicator.

16. A system comprising:
one or more processors;
memory; and
one or more non-transitory computer-readable media storing computer-executable instructions that, when executed, cause the one or more processors to perform:
in a software testing environment comprising a communication link between a software test orchestration tool and a reliability condition dashboard, receiving from the software test orchestration tool software test results at an application level of granularity, wherein the software test results comprise a plurality of reliability status category indicators for a plurality of software applications, wherein the reliability status category indicators comprise an indication of pass and an indication of fail;
calculating a reliability metric based on the plurality of reliability status category indicators for the plurality of software applications, wherein the reliability metric incorporates non-binary reliability status category indicators configured to have more than two different values, and at least one of the non-binary reliability status category indicators comprises a value indicating that an error result has been manually overridden as having a testing-related error determined to be harmless;
displaying the reliability metric in a user interface of the reliability condition dashboard, wherein the user interface comprises filter criteria and filters applications having, for a reliability status category indicator, the value indicating that an error result has been manually overridden as having a testing-related error determined to be harmless, whereby the applications having, for a reliability status category indicator, the value indicating that an error result has been manually overridden as having a testing-related error determined to be harmless are not displayed;
receiving a reliability metric threshold for the reliability metric; and
providing an alert responsive to determining that the reliability metric does not meet the reliability metric threshold.

17. The system of claim 16, wherein applications tested but manually overridden as having a harmless error are deemed as passed applications.

18. One or more non-transitory computer-readable media storing computer instructions that when executed by a computing system cause the computing system to perform operations comprising:
during a software smoke test scenario applying a one-to-one mapping between test cases and a plurality of software applications, in a software testing environment comprising a communication link between a software test orchestration tool and a reliability condition dashboard, receiving from the software test orchestration tool software test results at an application level of granularity, wherein the software test results comprise a plurality of reliability status category indicators for the plurality of software applications comprising a given software application, wherein the reliability status category indicators comprise an indication of pass and an indication of fail;

receiving from the software test orchestration tool an indication of a plurality of software packages to which the plurality of software applications belong;

calculating a plurality of package reliability metrics for the plurality of software packages, wherein the package reliability metrics incorporate non-binary reliability status category indicators configured to have more than two different values, and at least one of the non-binary reliability status category indicators comprises a value indicating that an error result has been manually overridden as having a testing-related error determined to be harmless;

displaying, in the reliability condition dashboard, the plurality of package reliability metrics;

calculating a first overall reliability metric for the software test results that are displayed;

receiving a reliability metric threshold for the overall reliability metric; and responsive to determining that the first overall reliability metric does not meet the reliability metric threshold, blocking an attempted release of the given software application for which the software test results are received;

displaying the first overall reliability metric in the reliability condition dashboard;

displaying a filter panel in the reliability condition dashboard configured to receive a filter of the reliability status category indicators;

receiving, via the filter panel, a selection of a subset of the reliability status category indicators;

calculating an updated overall reliability metric based on the subset of the reliability status category indicators; and displaying the updated overall reliability metric;

wherein applications having, for a reliability status category indicator, the value indicating that an error result has been manually overridden as having a testing-related error determined to be harmless are deemed as passed applications during calculation of the first overall reliability metric or ignored.

19. The one or more non-transitory computer-readable media of claim 18, wherein the operations further comprise:

displaying a first reliability status category indicator for a given test result;

displaying one or more user interface elements configured to receive a selection of a reliability status category for the first reliability status category indicator;

receiving via the one or more user interface elements, a selection of a new reliability status category;

updating display of the first reliability status category indicator to reflect the new reliability status category;

calculating an updated overall reliability metric; and displaying the updated overall reliability metric.

20. The method of claim 1 wherein:

applications having, for a reliability status category indicator, the value indicating that an error result has been manually overridden as having a testing-related error determined to be harmless are deemed as passed applications during calculation of the reliability metric or ignored.

* * * * *